US010571265B2

(12) United States Patent
Jouanet et al.

(10) Patent No.: US 10,571,265 B2
(45) Date of Patent: Feb. 25, 2020

(54) METHOD AND ELECTRONIC CALCULATOR FOR DETERMINING THE TRAJECTORY OF A MOBILE OBJECT

(71) Applicant: COMMISSARIAT A L'ENERGIE ATOMIQUE ET AUX ENERGIES ALTERNATIVES, Paris (FR)

(72) Inventors: Laurent Jouanet, Autrans (FR); Mikael Carmona, Tencin (FR); Nathalie Sprynski, Saint Pierre d'Allevard (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 71 days.

(21) Appl. No.: 15/532,438

(22) PCT Filed: Nov. 30, 2015

(86) PCT No.: PCT/FR2015/053255
§ 371 (c)(1),
(2) Date: Jun. 1, 2017

(87) PCT Pub. No.: WO2016/087755
PCT Pub. Date: Jun. 9, 2016

(65) Prior Publication Data
US 2017/0268873 A1      Sep. 21, 2017

(30) Foreign Application Priority Data

Dec. 1, 2014   (FR) ..................................... 14 61695

(51) Int. Cl.
*G01C 7/04*          (2006.01)
(52) U.S. Cl.
CPC ..................... *G01C 7/04* (2013.01)

(58) Field of Classification Search
None
See application file for complete search history.

(56) References Cited

U.S. PATENT DOCUMENTS

| 4,536,763 A | * | 8/1985 | von Pieverling | ....... G01S 13/94 342/107 |
| 5,064,006 A | | 11/1991 | Waters et al. | |
| | | (Continued) | | |

FOREIGN PATENT DOCUMENTS

| EP | 0 366 567 A2 | 5/1990 |
| GB | 2 086 055 A | 5/1982 |

OTHER PUBLICATIONS

International Search Report dated Mar. 17, 2016 in PCT/FR2015/053255, filed Nov. 30, 2015.

*Primary Examiner* — Lina M Cordero
(74) *Attorney, Agent, or Firm* — Oblon, McClelland, Maier & Neustadt, L.L.P.

(57) ABSTRACT

A method for determining trajectory of a mobile object, including: provision of an object including sensors; displacement of the sensors along one and the same trajectory, the sensors maintaining one and the same distance between themselves and each measuring one and the same physical quantity; determination of instants for which the object has travelled an aggregate curvilinear distance which is equal to an integer multiple of the distance and calculation of a direction tangent to the trajectory of the object, for each of the instants determined; automatic reconstruction of the trajectory followed by the mobile object during its displacement by an interpolation, based on, for each reference instant determined, the measured tangent calculated for the reference instant.

18 Claims, 3 Drawing Sheets

(56) References Cited

U.S. PATENT DOCUMENTS

| | | | |
|---|---|---|---|
| 6,405,136 B1* | 6/2002 | Li | E21B 47/04 |
| | | | 175/45 |
| 2003/0024305 A1* | 2/2003 | Ireland | G01V 1/40 |
| | | | 73/152.02 |
| 2006/0001566 A1* | 1/2006 | Maass | G01S 7/295 |
| | | | 342/70 |
| 2008/0066334 A1 | 3/2008 | David et al. | |
| 2008/0195316 A1* | 8/2008 | Krishnaswamy | G01C 21/165 |
| | | | 701/469 |
| 2008/0211808 A1 | 9/2008 | David et al. | |
| 2010/0175922 A1* | 7/2010 | Ignova | E21B 7/04 |
| | | | 175/24 |
| 2013/0341091 A1* | 12/2013 | Sugiura | E21B 7/04 |
| | | | 175/24 |

\* cited by examiner

METHOD AND ELECTRONIC CALCULATOR FOR DETERMINING THE TRAJECTORY OF A MOBILE OBJECT

The invention concerns a method for determining the trajectory of a mobile object. The invention also concerns a method for detecting the difference between the trajectory of a mobile object and a reference trajectory. The invention finally concerns an electronic calculator and a storage medium for implementing these methods.

US2008/0195316 describes a movement estimation device based on two image sensors and an inertial module, in one piece and fixed to a vehicle to be located relative to features of interest of the environment. The document also describes an inertial module fixed to a mobile object and the analysis of the position of the mobile object by image sensors. By analyzing the images at different times and by identifying features of interest in these images, cross-referenced to the measurements from the inertial module, the above document determines the movement of the object from the evolution of the position of the features of interest. The presence of two image sensors is exploited to perform a stereoscopic analysis of the position of the features of interest. The document looks for the presence of the same characteristic point in both images simultaneously.

There exist systems and methods for determining the trajectory of a mobile object when the latter moves in space, for example in a pipe. One example is described in the patent application GB-2086055-A (Sunstrand Data Control). Two sets of accelerometers spaced by a distance L measure the inclination of the pipe at different points. The measurements are collected all along the path of the object in the pipe. The total distance covered is measured by a dedicated sensor (cable length transducer 28) at the level of a cable reel.

However, the above system has the disadvantage that these measurements are produced by means of sensors that have particular utilization constraints. For example, the measurements can be produced only if the trajectory of the object conforms to certain properties (for example, it must be oriented in the direction of gravity, here for example because the use of accelerometers alone entails an absence of sensitivity in azimuth, and, the embodiment in which the system is necessarily driven by its own weight) or moves in a specific medium (for example a hollow tube). The above necessitates in particular a dedicated sensor the role of which is to measure the total distance traveled, which complicates the manufacture of the system and results in an increased overall size.

In fact, the above system can be used only in certain particular cases of a trajectory in which the distance traveled can be simply and accurately measured by an external system. It is more difficult to use if the object moves along a trajectory that is more complex than a simple movement in the direction of gravity. As a result of this systems of this kind are very specific to a given application and cannot be easily modified to be transposed to another use. Transposition of this kind then calls for a technical adaptation that may be complicated to execute.

The invention aims to address one or more of the above disadvantages. The invention therefore relates to a method as defined in the appended claims.

The invention also concerns a method for detection of the difference between the trajectory of a mobile object and a reference trajectory, including:
the acquisition of a reference trajectory that the object must follow when it moves;
the determination of the trajectory followed by the object when it moves;
the comparison of the trajectory that has been determined and the reference trajectory;
the sending of an alarm signal if a difference greater than a predetermined value is detected between said trajectory that has been determined and said reference trajectory, no alarm signal being sent otherwise;
and in which the trajectory of the object is determined according to the invention.

Another aspect of the invention concerns an information storage medium containing instructions for the execution of the invention.

Another aspect of the invention concerns an electronic calculator for executing a method according to the invention, as defined in the appended claims.

Other features and advantages of the invention will emerge clearly from the following description thereof given by way of nonlimiting example and with reference to the appended drawings, in which.

Figure 1:
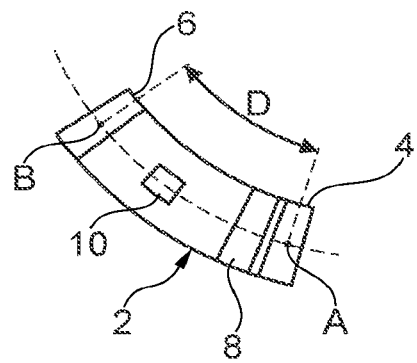
FIG. 1 is a diagram showing a mobile object the trajectory of which is to be measured.

FIG. 1 shows an example of a mobile object 2 able to move along a trajectory in space. The object 2 includes:
first and second sensors 4 and 6,
an attitude module 8,
a unit 10 for acquisition of data and calculation of the trajectory traveled by the object 2. The unit 10 can be integrated into the object 2 but can also be remote from the object 2.

Each of the sensors 4, 6 is able to measure N different physical parameters at different points of the object 2. To be more precise, the sensor 4 is able to measure N physical parameters at a point A and the sensor 6 is able to measure the same N physical parameters at another point B of the object 2 different from the point A. Hereinafter the respective positions of the sensors 4 and 6 are treated as being the same as those of the points A and B.

The number N of physical parameters is a non-zero natural integer, preferably greater than or equal to 2.

Each of the N physical parameters is chosen so that, in the portion of space in which the object 2 moves or comes to move:

at least one of these physical parameters does not have the same value at all points in this portion of space;

at each point of this portion of space all these physical parameters have a value that does not vary during the movement of the object between the points A and B by more than 1% to 2%.

For example, the N physical parameters are chosen from the group consisting of:

the acceleration due to gravity, measured in a predefined frame of reference;
the magnetic field, measured in a predefined direction;
the electromagnetic field (via an electromagnetic receiver);
the luminous intensity, measured for predefined wavelengths and propagation directions;
the temperature;
the atmospheric pressure;
an echo or a flight time measured in different directions;
an image acquired for example by a video camera or an image sensor;
the acoustic field (via a microphone);
the seismic field (via an accelerometer).

The sensors 4, 6 are mechanically interconnected to maintain between them a distance D constant to within 2% or 5% when they are moved along the same trajectory. The sensor 6 therefore passes through all the locations previously occupied by the sensor 4 when the object 2 moves along the trajectory. Here the distance is defined as being the curvilinear abscissa measured along this trajectory separating from each other the measurement points A and B of the sensors 4 and 6.

The object 2 is for example a road vehicle able to move over a surface. The sensors 4, 6 are aligned along a central longitudinal axis of this vehicle so that the sensors 4 and 6 follow the same trajectory over the surface when the object 2 moves.

The value of the distance D is advantageously chosen to conform to the sampling conditions of the Shannon theory applied to the angles that define the direction tangential to the trajectory. In fact, it is known how to define a direction tangential to a trajectory at any point of that trajectory. In a three-dimensional space, this tangent has two angle parameters. Each of these angles is a function with the curvilinear abscissa of the trajectory as a variable. Reference is therefore made to "angle functions". Here the value of D is strictly less than the quantity $1/(2*F)$ where F is the maximum spatial frequency of these angle functions. The spatial frequencies of the trajectory are for example known from calculating the Fourier transform of the angle functions associated with that trajectory at all points on that trajectory.

As the trajectory is generally not known before executing the method, the value of D may be chosen as a function of typical and/or permitted trajectories as a function of the context in which the object 2 is used. Here, for example, the object 2 is called upon to move on a road or along a guide device such as a railroad track or along a cable. The person skilled in the art can therefore deduce from this, even prior to the movement, that the trajectory actually followed by the object 2 will have certain limits. For example, in normal operation, the object 2 does not normally depart from the road or the guide device by more than a certain predetermined limit distance. A range of values of the distance D can therefore be determined taking account of these limits, without this limiting the reliability or the versatility of the method.

The module 8 is able to determine a direction tangential to the trajectory at this measurement point. For example, the module 8 measures the attitude of the object 2 in a spatial frame of reference tangential to the trajectory at a measurement point. By attitude is meant the orientation of the object 2 in that frame of reference. This measurement point is considered to coincide with the point A or B. In particular, the module 8 enables determination at a given time of the Serret-Frenet frame of the object at that measurement point. The module 8 therefore determines the tangent to the trajectory of the object and therefore the angles previously described that are parameters of that tangent. The module 8 is for example a 3A3M3G attitude module, for example the LSM9DS0 module from the company STMicroelectronics.

In this example, the parameters measured are accelerations along three mutually orthogonal measurement axes. Thus N equals 3. Each of the sensors 4, 6 is therefore an accelerometer with three measurement axes. The respective measurement axes of the sensors 4, 6 are oriented in the same manner.

Figure 2:
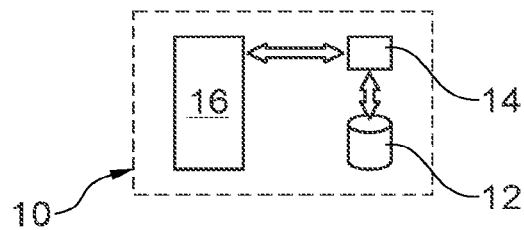
FIG. 2 is a diagram showing a unit for calculating the trajectory of the object from FIG. 1.

FIG. 2 shows the unit 10. Here this unit 10 is configured:
to acquire and to store measurement data from the sensors 4, 6 and the module 8, and
to reconstruct automatically the trajectory followed by the object 2 as it moves.

This unit 10 therefore includes:
a data acquisition and exchange interface 16;
an information storage medium 12;
a programmable electronic calculator 14.

The calculator 14 executes instructions contained in the medium 12. This medium 12 contains in particular instructions for the execution of the method shown in the figures. The interface 16 acquires the data measured by the sensors 4, 6 and by the module 8. For example, the interface 16 includes a communication bus such as a wired (for example RS485) bus or a wireless (for example Bluetooth) bus. The unit 10 advantageously also includes a system for synchronization of the measurements from the sensors 4, 6 and the module 8.

Figure 3:
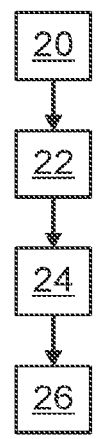
FIG. 3 is a flowchart of a method for reconstructing the trajectory of the object 1.

A generic embodiment of the method is described first with reference to FIG. 3, and is used to determine the trajectory TR followed by the object 2 as it moves between an initial time $t_0$ and a final time $t_f$. The trajectory TR to be obtained is a function giving the position of the object 2 in a spatial frame of reference for each time t between $t_0$ and $t_f$ inclusive.

First, during a step 20, the object 2 is moved in space. The sensors 4, 6 being fastened to the object 2, they are therefore also moved in space. During the movement of the object 2, each of the sensors 4, 6 measure the N physical parameters and the module 8 measures the attitude of the object 2. These measurements are produced continuously throughout the movement, for example at the rate of one measurement every 5 ms. These measurements are preferably produced simultaneously by the sensors 4, 6 and the module 8. The data measured by the sensors 4, 6 and the module 8 is for example then stored on the medium 12 via the interface 16.

Reference times are then determined during a step 22 in which the object 2 has traveled a cumulative distance $D_{tot}$ that is equal to an integer multiple of the distance D previously defined as the distance between the points A and B. The cumulative distance $D_{tot}$ is measured along the trajectory TR traveled from the position, termed the initial position, occupied by the object 2 at the initial time $t_0$. In this example, the initial position of the object 2 is that occupied by the point A at the initial time. Here the distance $D_{tot}$ is considered to be zero at the initial time. The distance $D_{tot}$ is for example the curvilinear abscissa of the point A along the trajectory TR with the initial position as origin.

The reference times $t_i$ estimated by the method are progressively defined from the time $t_0$, where "i" is a non-zero integer index that uniquely indexes each reference time.

Figure 4A:
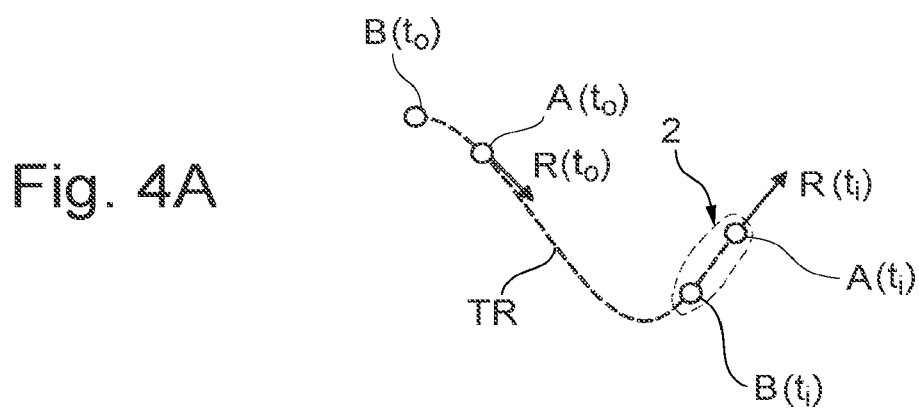
FIGS. 4A and 4B are diagrams showing stages of the movement of the object from FIG. 1 over time.
Figure 4B:
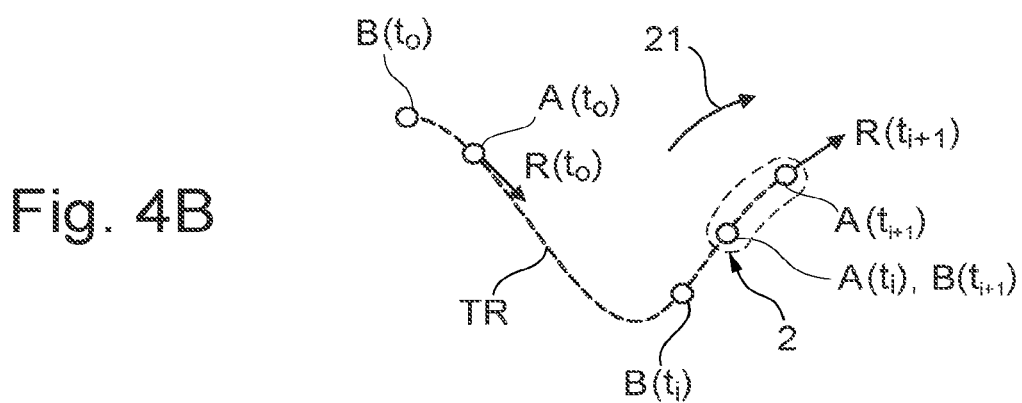

FIGS. 4A and 4B respectively show the positions of the object 2 at the time $t_{i-1}$ and at the next reference time, denoted $t_i$. The point A at the time $t_i$ bears the reference $A(t_i)$. Analogous notation is used for the other times and for the point B.

It is considered that between these two times $t_{i-1}$ and $t_i$ the object 2 has moved a distance equal to the distance D to within 1% or 2% or 5%. The arrow 21 represents the direction of movement of the object 2. At the time $t_i$ the point B occupies the position that the point A occupied at the time $t_{i-1}$ because the distance between the points A and B remains equal to the distance D. In fact, the physical parameters measured by the sensor 6 at the time $t_i$ are the same as those measured by the sensor 4 at the time $t_{i-1}$.

Accordingly, to determine these reference times $t_i$ a correlation is looked for each of the N physical parameters measured between the temporal evolutions of this physical parameter as measured by the sensors 4 and 6, respectively.

In this example, the step 22 is executed after the object 2 has stopped moving, i.e. after the time $t_f$.

For each known reference time $t_{i-1}$ the next reference time $t_i$ is determined in the following manner.

For each physical parameter M of the N physical parameters measured, the correlation between the measurements from the sensors 4 and 6 is calculated. This calculation is restricted to the values measured during a sampling time interval of predefined duration T with its origin at the time Here the duration T is acquired automatically by the unit 10 before the start of execution of the method.

The value of T is for example greater than or equal to ten times the delay between two consecutive measurements from a sensor 4 or 6. The value of T is moreover preferably less than or equal to 0.1 times the total duration of the movement. In this example, T is equal to 250 ms.

Figure 5A:
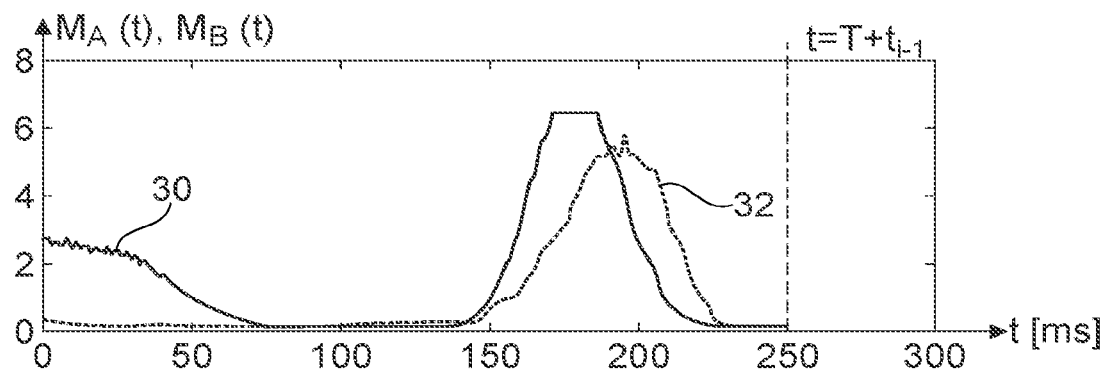
FIGS. 5A and 5B are diagrams showing the calculation of a correlation function from values of physical parameters measured as a function of time by a respective pair of sensors of the object from FIG. 1 when that object moves.

FIG. 5A shows an example of the evolution over time of the measurements from the sensors 4 and 6 for one of the N physical parameters measured. These measurements are respectively denoted $M_A(t)$ and $M_B(t)$ and correspond to the curves 30 and 32. The time t (in ms) is represented on the abscissa axis. For simplicity, the time $t_{i-1}$ is taken as the time origin in this figure. The value of M measured is represented on the ordinate axis (here expressed in arbitrary units for simplicity).

Figure 5B:
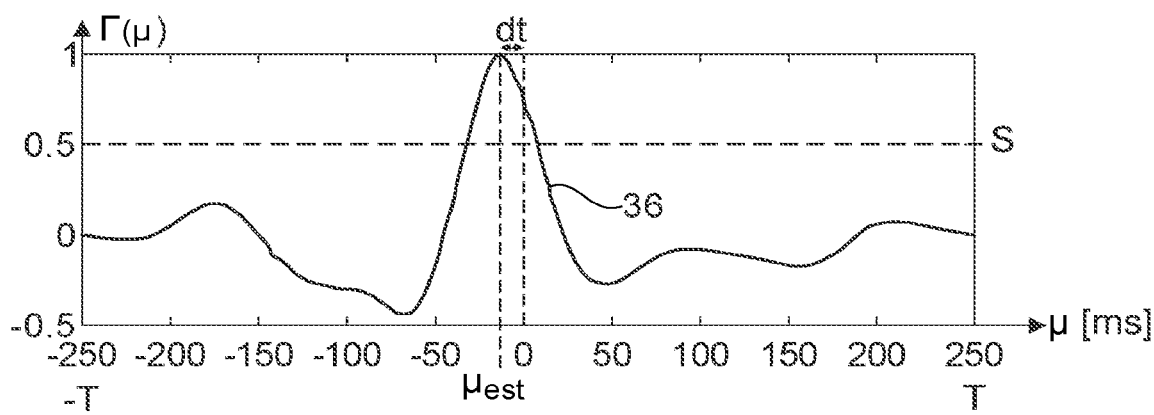

A correlation $\Gamma$ can be calculated using the following function:

$$\Gamma(\mu) = \int_{t \in [t_i; t_i + T]} M_A(t) M_B(t - \mu) dt$$

where $\mu$ is in the range $[-T; T]$. FIG. 5B shows the correlation $\Gamma$ (curve 36) over the range $[-T; T]$, calculated in this way from the measurements of the parameter M by the sensors 4 and 6 shown in FIG. 5A.

The estimated time $\mu_{est}$ at which the calculated correlation $\Gamma$ has a maximum in the range $[-T; T]$ is automatically detected. There is then calculated the value of a temporal offset dt between this time $\mu_{est}$ and the origin $\mu_0 = 0$ of the range $[-T; T]$. This operation is performed using maximum detection algorithms well known to the person skilled in the art. This operation is repeated for each of the other N−1 physical parameters.

Finally, the average offset, denoted $dt_{moy}$, of the offsets dt calculated for all the physical parameters is calculated. The next reference time $t_i$ is then determined using the following formula: $t_i = t_{i-1} + dt_{moy}$.

The above operations are repeated iteratively up to the final time $t_f$. Accordingly, the reference times are therefore determined progressively starting from the time $t_0$.

For a given parameter M, the offset dt is advantageously calculated only if the maximum value of the correlation function $\Gamma$ over the range $[-T; T]$ is greater than or equal to a predetermined threshold S. If the function $\Gamma$ is below this threshold S, then it is considered that the measurements $M_A(t)$ and $M_B(t)$ are not correlated and the corresponding offset dt is not calculated.

This makes it possible, in the calculation of the average offset $dt_{moy}$, to ignore physical parameters for which it has not been possible to detect any correlation, which would falsify the calculation of $t_i$.

For example, the value of the threshold S is made greater than or equal to 1.5 times or twice the average value of the function $\Gamma$ over the range $[-T; T]$. There is therefore a number K of offsets dt each calculated for a different parameter M, where the number K is a constant less than or equal to N. The average offset $dt_{moy}$ is then calculated only on these K values and ignores the N−K values for which there is no correlation between the measurements $M_A(t)$ and $M_B(t)$. Here the value chosen for the threshold is S=0.5.

Following the step 22 there is therefore available a list of all the reference times $t_i$ from the start (at time $t_0$) of the movement of the object 2.

Then, during a step 24, there is determined for each these times $t_i$ a spatial vector $R(t_i)$ (FIG. 4A) that is tangential to the trajectory TR at the point A of the object 2 at this time $t_i$. This vector $R(t_i)$ is for example a director vector of the tangent, the coordinates of which are expressed in a fixed spatial frame of reference in which the object 2 moves.

Here this vector $R(t_i)$ is determined by calculating the Serret-Frenet frame at the point A of the object 2 at this time $t_i$ using the module 8. In a known manner, the data measured by the module 8 makes it possible to construct directly a frame of reference of this kind. The vector $R(t_i)$ is obtained directly from this frame of reference, because it is one of the components of that frame of reference. For example, to this end, there are extracted from the medium 12 the values of the attitude data measured by the module 8 for this time $t_i$.

There is therefore available a list of vectors $R(t_i)$ for each of the reference times $t_i$.

Moreover, there corresponds to each of these times $t_i$ a particular value of the cumulative distance $D_{tot}$ traveled at that time. Because of the given definition of the reference timers, this cumulative distance is expressed as follows: $D_{tot}(t) = D*i$.

Finally, during a step 26, the trajectory TR of the object 2 is reconstituted from the pairs of values $D_{tot}(t_i)$, $R(t_i)$ calculated previously for the times $t_i$.

To this end, there is used for example a spherical linear interpolation (SLERP) method, or a method of interpolation by cubic splines on a sphere. For example, there is used one of the methods described in the PhD theses of Nathalie Sprynski, "Reconstruction de courbes et surfaces à partir de données tangentielles", Université Joseph Fourier, Grenoble, France, 2007 and Mathieu Huard "Modélisation géométrique et reconstruction de formes équipées de capteurs d'orientation", Université Joseph Fourier, Grenoble, France, 2013.

Figure 6:
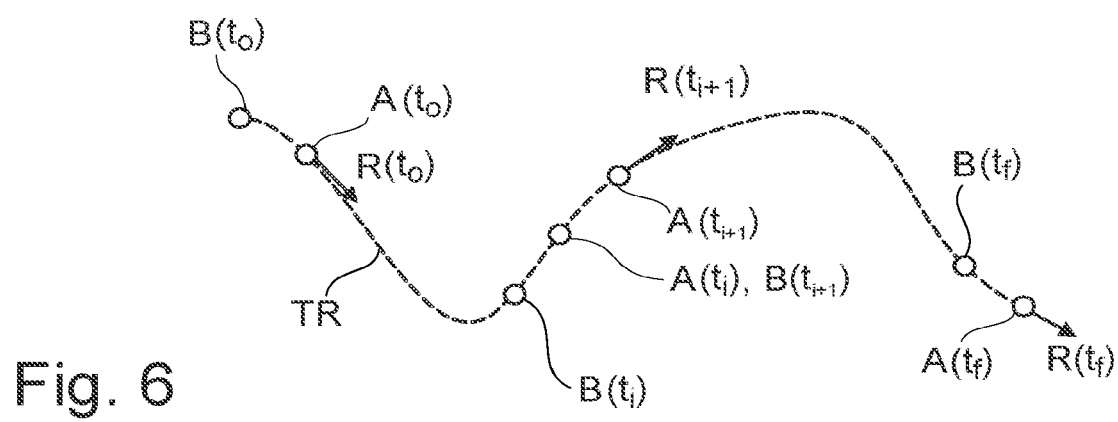
FIG. 6 is a diagram showing a portion of the trajectory of the object from FIG. 1 reconstructed from the data from FIGS. 5A and 5B.

The trajectory TR is then obtained for all times between $t_0$ and $t_f$, as shown by FIG. 6. In that figure, for simplicity, the points A and B are shown only for the times $t_0$, $t_i$, $t_{i+1}$ and $t_f$. Alternatively, the trajectory can be reconstructed not only from the vectors R(ti) but using the complete Serret-Frenet frame that is determined by the module 8 for each time $t_i$. The reconstruction is then based on this information using the method described in the above thesis of Mathieu Huard. Greater accuracy and improved stability of the reconstruction of each trajectory are therefore obtained.

Figure 7:
FIG. 7 is a flowchart of a method for automatic measurement of the difference between the trajectory of the object from FIG. 1 and a predetermined trajectory.

FIG. 7 is a diagram showing one example of a method for surveillance of the object 2 to detect a difference between its trajectory and a predefined reference trajectory. This method is advantageously executed by the unit 10.

A reference trajectory is acquired automatically during a step 40. This reference trajectory is a predefined setpoint trajectory that the object 2 is supposed to follow as it moves. For example, this reference trajectory has been determined previously by application of the method from FIG. 3.

Then, during a step 42, the object 2 is moved and its trajectory is determined as and when it moves, by applying the steps 20 to 26 described above.

A difference between the trajectory that has been determined and the reference trajectory is measured during a step 44. Here the step 44 is repeated during the movement, for example as and when the trajectory is determined during the step 42. For example, a zone termed the "safety zone" is defined that extends radially around the reference trajectory to a predefined distance. For example, the safety zone is a cylinder of predefined radius (that radius corresponding to the safety threshold), the main axis of the cylinder being the reference trajectory. The trajectory that has been determined is said to depart from the reference trajectory if it leaves the safety zone.

If the trajectory that has been determined departs from the predetermined trajectory, then an alarm signal is sent by the unit 10 during a step 46, this alarm signal not being sent if this difference is less than or equal to the predetermined value.

A particular embodiment of this method for acquiring the trajectory followed by the periphery of a wheel is described next with reference to FIGS. 8 to 10.

Figure 8:
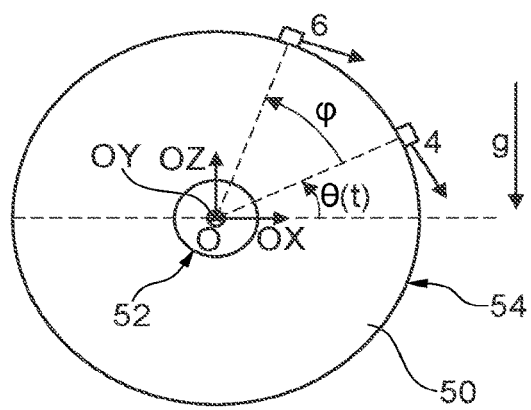
FIG. 8 is a diagram showing another embodiment of the object from FIG. 1.

FIG. 8 shows a wheel 50 including a hub 52 and a circular periphery 54 centered on a center O. The wheel 50 is for example a bicycle wheel mounted to rotate on a fixed frame. In this example, the object 2 the trajectory of which is to be determined consists of 4 and 6 and is fixed at the periphery 54 of the wheel 30. Here the aim is to detect any deformation of the trajectory of the wheel 50 when operating caused, for example, by a rotation anomaly (for example caused by wear of the hub and/or of the support of the fixed frame).

The sensors 4, 6 are placed at separate points on the periphery 54 and are separated by the curvilinear distance D=20 cm measured along the trajectory. Here the wheel 50 has a radius R equal to 30 cm.

An orthonormal spatial frame of reference OXYZ centered on the point O and including axes OX, OY and OZ is defined. The axes OX, OZ are in the plane of the wheel 50. Here the axis OZ is parallel to and in the opposite direction to the terrestrial gravitational field, denoted g. The axis OX is horizontal.

The wheel 50 turns about the axis OY perpendicular to the axes OX and OZ. In this example, the wheel 50 turns with a constant angular speed $\omega$=0.91 revolution/s i.e. approximately 5.73 rad/s. However, it is generally not necessary for this speed to be constant.

In this example, each of the sensors 4, 6 includes a single-axis accelerometer the measurement direction of which is tangential to the periphery 54 at the measuring point of this sensor. For example, these accelerometers are MS9002 accelerometers from the French company Safran-Colibrys (France). The data measured by these accelerometers is transmitted to the unit 10 (not shown) to be stored therein. The angle between the axis OX and the line connecting the center O to the measurement point of the sensor 4 is denoted $\theta M=\omega*t$ and the angle between the lines connecting the center O to the measurement points of the sensors 4 and 6 is denoted $\varphi$. Here this angle $\varphi$ is equal to approximately 0.67 rad.

Each of the sensors 4 and 6 therefore measures a single physical parameter, which is the projection of the component of the acceleration due to gravity according to the measurement direction of this sensor plus its own acceleration in the frame of reference OXYZ. Thus: $M_A(t)=g*\cos(\omega*t)$ and $M_B(t)=g*\cos(\omega*t+\varphi)$, where g=9.81 m/s$^2$.

Here, because of the configuration of the sensors 4, 6 and notably the measurement directions, the attitude information for the object 2 is obtained from the sensors 4 and 6. The sensor 4 therefore serves as the module 8 and there is therefore no need to use a separate module 8.

Figure 9:
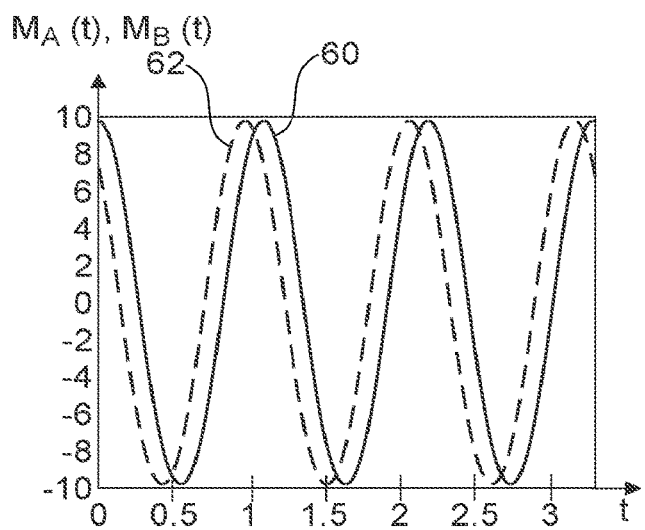
FIG. 9 is a diagram showing, as a function of time, values of physical parameters measured by sensors of the object from FIG. 8 during movement of that object.

FIG. 9 shows the evolution of the respective parameters $M_A(t)$ (curve 60) and $M_B(t)$ (curve 62) measured by the sensors 4, 6 during a measurement period of five seconds. In this figure, the abscissa axis expresses the duration (in seconds) and the ordinate axis expresses the acceleration (in m/s$^2$) measured by each sensor.

The method from FIG. 7 and in particular the steps 20 to 26 are therefore executed to determine the trajectory of the wheel in the frame of reference OXYZ and to be more precise that of the measurement point A of the sensor 4 and for surveillance of a difference with respect to a reference trajectory. The requirement is therefore to determine the evolution of the angle $\theta$ as a function of the curvilinear distance traveled by the point A when the wheel turns. In the case of the wheel 50, the reference trajectory corresponds to a circle of center O and radius R. In fact, the spatial frequency F of this trajectory is given here by the formula $F=1/(2*\pi*R)$. With the dimensions chosen for the wheel 50, F is equal to 0.53 m$^{-1}$. The Shannon condition previously referred to is reflected in the condition D<94.2 cm and is therefore satisfied here because here D has the value 20 cm.

The operations of the step 22 make it possible to determine the reference times from the data from FIG. 9. In this example a duration T equal to 1 s is chosen. There is chosen as the initial time $t_0$=0 with $A(t=0)=A_0$ being the initial position of the sensor 4. Looking for correlation makes it possible to calculate the time=$t_0$+dt where dt=0.116 seconds. In this example, given the geometry of the wheel 50 and the disposition of the sensors 4 and 6, this value of the offset could be predicted from the phase difference $\varphi/\omega$. It is therefore deduced from this that between the times $t_0$ and $t_1$, the point A moved a distance equal to D=20 cm. The same applies to the following times.

Once all the reference times have been determined, the trajectory is reconstructed from the curvilinear abscissa value (i.e. the cumulative distance $D_{tot}$ traveled by the point A since the time $t_0$) and the tangent value (obtained here directly from the measurement from the sensor 4) at each reference time.

Figure 10:
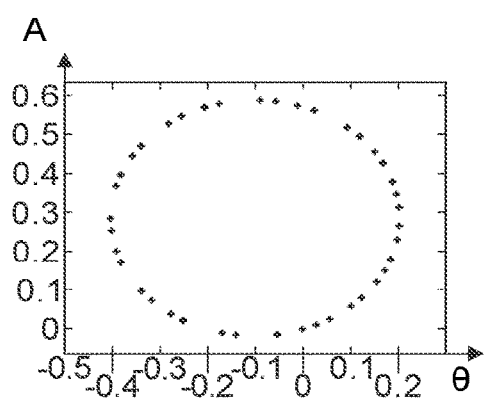
FIG. 10 is a diagram showing a portion of the trajectory of the object from FIG. 8 reconstructed from the data from the figure.

FIG. 10 shows the portion of the trajectory of the point A reconstructed from the data from FIG. 9 on completion of the method. The ordinate axis indicates the evolution of the angle $\theta$ and the abscissa axis indicates the curvilinear distance traveled by the point A as the wheel turns.

It is therefore possible to detect a difference between the trajectory traveled and the reference trajectory of the wheel 50.

Alternatively, if a reference is available on the trajectory, a difference can be detected directly from the angles reconstructed with the module 8. In fact, knowing a reference trajectory makes it possible to deduce therefrom the reference angles as a function of the curvilinear abscissa. The latter are used to calculate a difference with the angles reconstructed using this method.

The object 2 can be a different object. For example, it can be a road or rail vehicle, an inspection probe, a mobile mechanical part. The sensors 4 and 6 are mechanically connected, for example, so as to have the same attitude for the same curvilinear abscissa on the trajectory.

For example, the method can be used in the field of oil exploitation and prospecting to determine the trajectory of a pipe or a hose. The object 2 is then fastened to that pipe. For example, the spatial frequency F is of the order of 1 Hz or 10 Hz. In another example, the method can be used in a fairground ride of the "big wheel" type, to monitor the correct rotation of the ride, or of the "Russian mountain" type, to monitor the trajectory of wagons circulating on a rail or rails of the ride. The object 2 is for example a pair of wagons coupled to each other. The aim is for example to verify that these two wagons follow the same trajectory. In this case, the frequency F notably depends on the diameter of the loopings of the rail or rails of the ride. For example, this diameter is between 5 m and 50 m. Here the spatial frequency is $F=1/(pi*diameter)$ and therefore $F=0.0637 \text{ m}^{-1}$ if $D=5$ m and $F=0.00637 \text{ m}^{-1}$ if $D=50$ m.

In another example, the method can be used in a cable transportation system of "cable car" or "ski lift" type to monitor the evolution over time of the deformation (shape) of the supporting cable. The information on the evolution of the deformation of this cable is beneficial for the surveillance of its state of health (the standard result of surveillance of structures).

The reference trajectory can therefore have been determined in a different way. It depends in particular on the nature of the object 2 and the context in which it is called upon to evolve as it moves. For example, if the object 2 is a vehicle guided by a rail, then the reference trajectory is that of that rail.

The step 44 can be omitted. In this case the reference trajectory can be acquired only for determining the value of D, on the basis of the Shannon conditions applied to the reference trajectory.

The trajectory can be reconstructed in real time as the object 2 is moving. In this case, the times $t_i$ are calculated during the movement. The trajectory TR is then constructed by successive incrementations as and when the times $t_i$ are calculated. The steps 22 to 26 are therefore executed alternately and incrementally up to the end of the movement. The order of the steps of the method from FIG. 7 is then modified, in particular to measure a difference of the trajectory that has been determined relative to the reference trajectory as the trajectory that has been determined is constructed step by step.

The module 8 can measure the attitude of the object 2 only when a reference time has been determined.

The correlation can be calculated in a different way. Other functions can be used to calculate the correlation Γ.

The unit 10 may be implemented in a different way. In particular, the interface 16 can be different (serial, USB, wireless, etc. link). The unit 10 can be remote from the object 2. For example, it is situated at a distance from this object 2 and collects data measured by the sensors remotely by means of the interface 16.

When N=1, i.e. when each sensor measures only one physical parameter, then the calculation of the average offset $dt_{moy}$ is omitted. Instead, a single time offset dt is calculated for only this physical parameter and the next reference time $t_i$ is given by the following formula: $t_i=t_{i-1}+dt$.

The values of the duration T can be different. For example, a particular value of the duration T is defined for each of the N physical parameters. The same applies to the threshold S.

Alternatively, the step 24 of looking for correlations is carried out in a different way. For example, the value of the offset dt can be calculated by means of a Kalman filter so as to take into account the values of the offsets dt calculated for the preceding reference times, which makes it possible to refine the accuracy of the measurement and to avoid abrupt time variations.

The search for correlations can also be complemented by means of a wavelet base, which is particularly advantageous when the signals measured by the sensors 4, 6 have a different timescale (for example following incorrect calibration).

The invention claimed is:

1. A method for determining a trajectory of a mobile object, comprising:
    providing the mobile object including a first sensor and a second sensor mechanically interconnected and configured to measure at least one same physical parameter at different points of the mobile object;
    moving the first and second sensors along a trajectory, the first and second sensors being separated by a distance D that is constant to within 2% during movement along the trajectory, the distance D being defined as curvilinear abscissa separating the first and second sensors and measured along the trajectory;
    measuring during the movement the at least one same physical parameter by the first and second sensors, the at least one same physical parameter being chosen from a luminous intensity, a magnetic field, an acceleration due to gravity, an electromagnetic field, a temperature, an atmospheric pressure, a flight time, an image, an acoustic field, a seismic field, or an acceleration;
    determining times, as reference times (t), for which the mobile object has traveled a cumulative curvilinear distance along the trajectory that is equal to an integer multiple of the distance D by seeking a correlation between a temporal evolution of respective values of the at least one same physical parameter measured by each of the first and second sensors;
    calculating a direction tangential to the trajectory of the mobile object for each of the determined reference times;
    automatically reconstructing the trajectory followed by the mobile object during the movement by an interpolation and based on, for each corresponding reference time of the determined reference times:
        the cumulative curvilinear distance along the trajectory at the corresponding reference time, and
        the tangential direction calculated for the corresponding reference time.

2. The method as claimed in claim 1, wherein the reference times are determined progressively for successive times, wherein the determining further includes determining a time $t_i$ from a known time $t_{i-1}$, the times $t_i$ and $t_{i-1}$ designating two successive reference times, an index i being a natural integer, wherein the determining further includes, for the at least one same physical parameter:

automatic calculation of the correlation between values of the at least one same physical parameter measured over time by each of the first and second sensors over a sampling time interval with an origin at the time $t_{i-1}$ and having a duration T;

automatic calculation of a temporal offset dt between, a time for which the correlation has a maximum value over a range [−T, T] and the origin of the range [−T, T]; and calculation of a value of the time $t_i$ is determined by: $t_i = t_{i-1} + dt$.

3. The method as claimed in claim 2, wherein:

the first sensor and the second sensor are configured to measure N physical parameters, N being an integer greater than two;

the determining of the reference times further including:

for each of the N physical parameters, the automatic calculation of the correlation and the automatic calculation of the temporal offset dt based on the respective correlation, and calculation of an average offset $dt_{moy}$, defined as an average of the calculated temporal offsets dt, wherein the value of the time $t_i$ that has been determined being given by formula $t_i = t_{i-1} + dt_{moy}$.

4. The method as claimed in claim 3, wherein:

for each of the N physical parameters, the temporal offset dt is calculated only if the correlation is above a predefined threshold, and is not calculated otherwise; and the temporal offsets are averaged based on only the calculated temporal offsets dt.

5. The method as claimed in claim 3, wherein the mobile object moves over a surface.

6. The method as claimed in claim 3, wherein the first sensor and the second sensor are mechanically connected to have the same attitude for the same curvilinear abscissa on the trajectory.

7. The method as claimed in claim 2, wherein the tangential direction is measured by an attitude module belonging to the mobile object.

8. The method as claimed in claim 2, wherein the at least one same physical parameter is a parameter reflecting a position of the first and second sensors relative to a predefined spatial frame of reference.

9. The method as claimed in claim 2, further comprising, for each of the reference times that have been determined, calculating a Serret-Frenet frame associated with the calculated direction, and wherein the automatic reconstruction of the trajectory is further interpolated based on the frame.

10. The method as claimed in claim 1, wherein the tangential direction is measured by an attitude module belonging to the mobile object.

11. The method as claimed in claim 1, wherein the at least one same physical parameter is a parameter reflecting a position of the first and the second sensors relative to a predefined spatial frame of reference.

12. The method as claimed in claim 1, further comprising, for each of the reference times that have been determined, calculating a Serret-Frenet frame associated with the calculated direction, and wherein the automatic reconstruction of the trajectory is further interpolated based on the frame.

13. A method for detection of a difference between a trajectory of a mobile object and a reference trajectory, comprising:

acquiring of a reference trajectory that the mobile object must follow when the mobile object moves;

determining the trajectory followed by the mobile object when the mobile object moves;

comparing the trajectory that has been determined and the reference trajectory;

sending an alarm signal if the difference between the trajectory that has been determined and said reference trajectory is greater than a predetermined value, no alarm signal being sent otherwise;

wherein the trajectory of the mobile object is determined according to claim 1.

14. The method as claimed in claim 13, wherein the distance D is strictly less than 2*F, wherein F is a spatial frequency of angle functions that define a tangent to the reference trajectory.

15. The method as claimed in claim 13, wherein the reference times are determined progressively for successive times, wherein the determining further includes determining a time $t_i$ from a known time $t_{i-1}$, the times $t_i$ and $t_{i-1}$ designating two successive reference times, an index i being a natural integer, wherein the determining further includes, for the at least one same physical parameter:

automatic calculation of the correlation between values of the at least one same physical parameter measured over time by each of the first and second sensors over a sampling time interval with an origin at the time $t_{i-1}$ and having a duration T;

automatic calculation of a temporal offset dt between, a time for which the correlation has a maximum value over a range [−T, T] and the origin of the range [−T, T]; and calculation of a value of the time $t_i$ is determined by: $t_i = t_{i-1} + dt$.

16. A non-transitory computer readable storage medium including computer executable instructions for executing the method of claim 1.

17. An electronic calculator programmed:

to determine times, as reference times (t), at which a mobile object has traveled a cumulative curvilinear distance along a trajectory that is equal to an integer multiple of a distance D, the mobile object including a first sensor and a second sensor:

that are mechanically interconnected, that are configured to measure at least one same physical parameter at different points of the mobile object, and that remain at the distance D relative to one another that is constant to within 2% during the movement, the distance D being defined as the curvilinear abscissa separating said first and second sensors;

to calculate a direction tangential to the trajectory of the mobile object for each corresponding reference time of the determined reference times;

to reconstruct automatically the trajectory followed by the mobile object during the movement by an interpolation and based on, for each corresponding reference time determined: the cumulative curvilinear distance along the trajectory for each corresponding reference time of the determined reference times, and the direction tangential calculated for each corresponding reference time.

18. The electronic calculator executing a method according to claim 17, wherein the reference times are determined progressively for successive times, wherein the determining further includes determining a time $t_i$ from a known time $t_{i-1}$, the times $t_i$ and $t_{i-1}$ designating two successive reference times, an index i being a natural integer, wherein the determining further includes, for the at least one same physical parameter:

automatic calculation of the correlation between values of the at least one same physical parameter measured over time by each of the first and second sensors over a sampling time interval with an origin at the time $t_{i-1}$ and having a duration T;

automatic calculation of a temporal offset dt between, a time for which the correlation has a maximum value over a range [−T, T] and the origin of the range [−T, T]; and calculation of a value of the time $t_i$ is determined by:
$t_i = t_{i-1} + dt$.

* * * * *